United States Patent [19]

Compton

[11] Patent Number: 4,516,802
[45] Date of Patent: May 14, 1985

[54] TRUCK COVER

[76] Inventor: Warren L. Compton, Rte. 5, Box 87, Fairmont, W. Va. 26554

[21] Appl. No.: 446,260

[22] Filed: Dec. 2, 1982

[51] Int. Cl.³ .............................................. B60P 7/04
[52] U.S. Cl. ..................................................... 296/98
[58] Field of Search ................... 296/98, 100; 166/266, 166/23 R; 267/170, 177, 169

[56] References Cited

U.S. PATENT DOCUMENTS

| | | | |
|---|---|---|---|
| 2,000,905 | 5/1935 | Rockefeller | 267/170 |
| 3,549,197 | 12/1970 | Sibley | 296/98 |
| 3,549,199 | 12/1970 | Sibley | 296/98 |
| 3,628,826 | 12/1971 | Sibley | 296/98 |
| 3,774,958 | 11/1973 | Thorpe | 296/98 |
| 4,159,105 | 6/1979 | Vander Laan | 267/177 |
| 4,341,416 | 7/1982 | Richard | 296/100 |

Primary Examiner—Robert R. Song
Attorney, Agent, or Firm—Stanley J. Price, Jr.; John M. Adams

[57] ABSTRACT

A take-up roll is mounted transversely on the headboard or cab of a truck and a flexible tarpaulin-like cover is rolled up on the take-up roll, which is rotatably mounted on the cab. A free end portion of the cover is connected to the cross bar of a bail, which is pivotally mounted outboard the side walls of the open bed of a truck. In the forward position of the bail, the cover remains rolled up on the take-up roll. The rolled up cover on the take-up roll exerts a force overcoming a rearward spring force on the bail to maintain the bail in the forward position. A reversible motor is drivingly connected to the take-up roll to rotate the take-up roll in a first direction and unroll the cover by releasing the spring force normally applied to the bail to thereby pivot the bail on the truck side walls and unreel the cover in overlying relation with the open bed until the bail has pivoted to its rearwardmost position and the bed is covered. Rotation of the take-up roll in the opposite direction rolls up the cover and pivots the bail forwardly to return the bail to its forwardmost position and roll the cover up on the take-up roll. Guide rollers extend upwardly from the cab adjacent the end portions of the cross bar of the bail. The guide rollers are positioned vertically and are engageable with the lateral edges of the cover. The guide rollers maintain the cover centered on the take-up roll and eliminate binding of the cover as the cover is unrolled and rolled up on the take-up roll.

10 Claims, 9 Drawing Figures

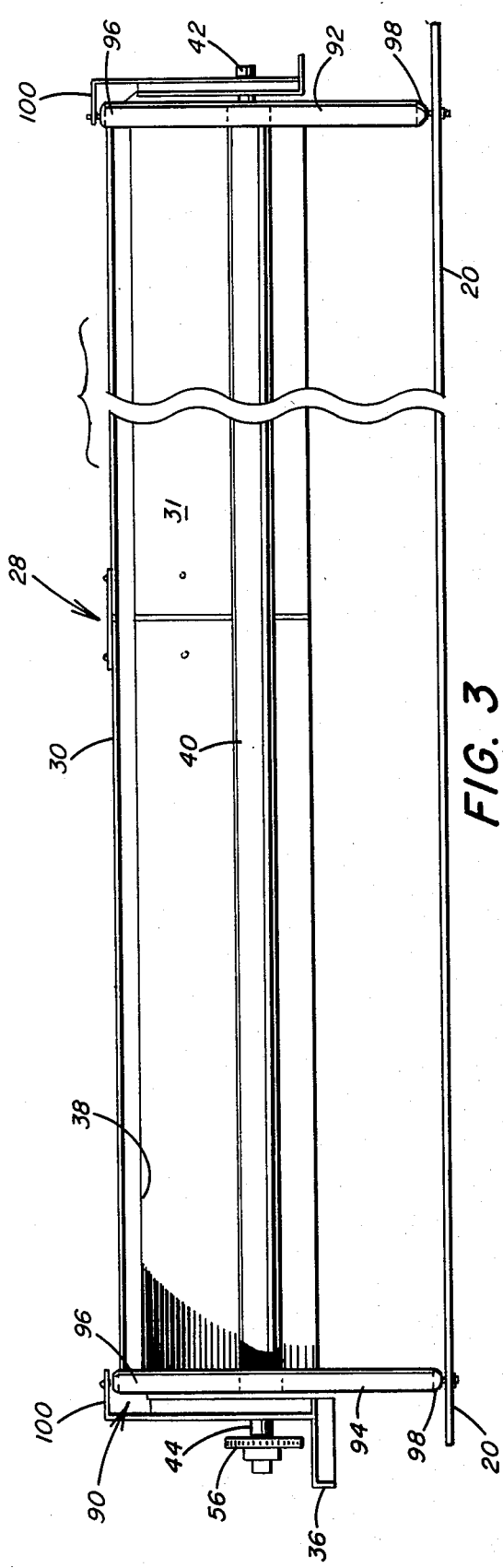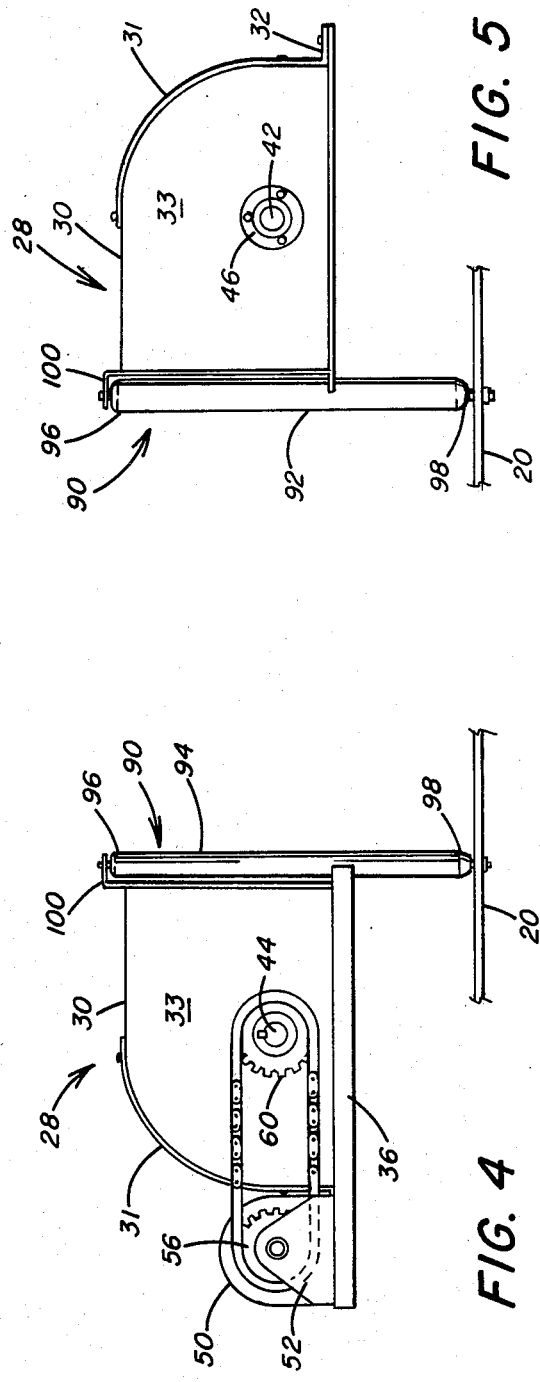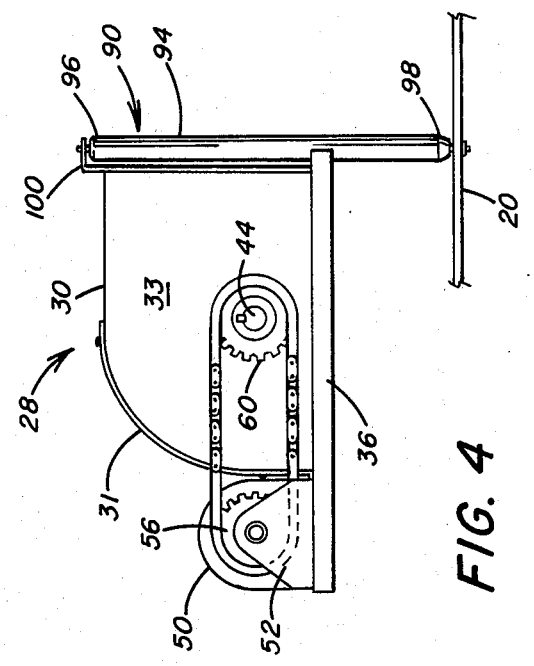

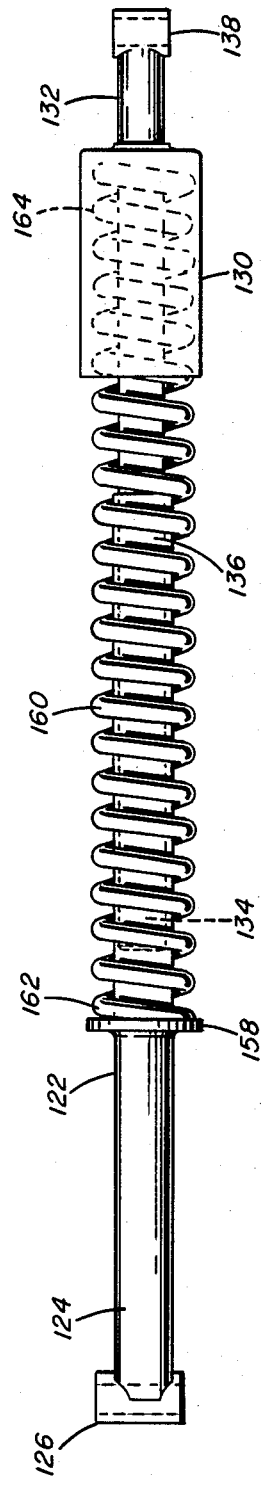
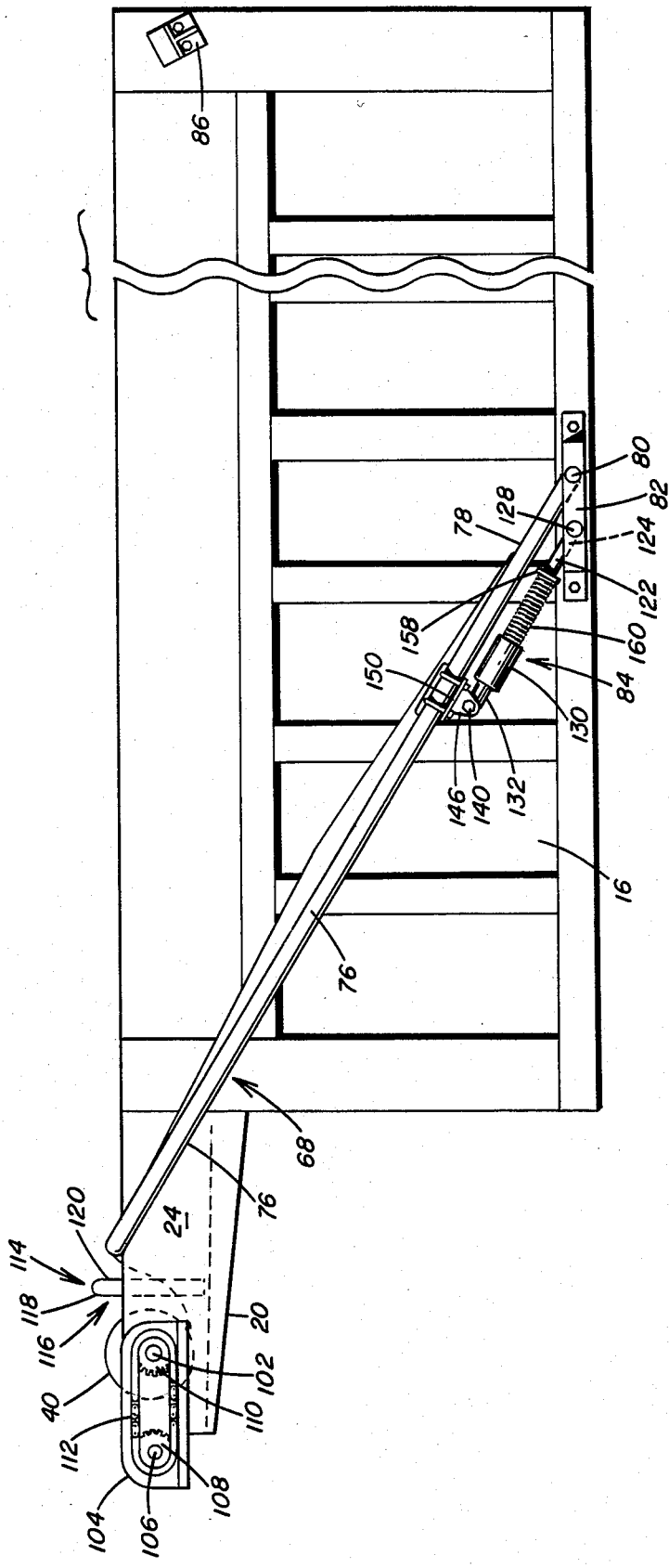

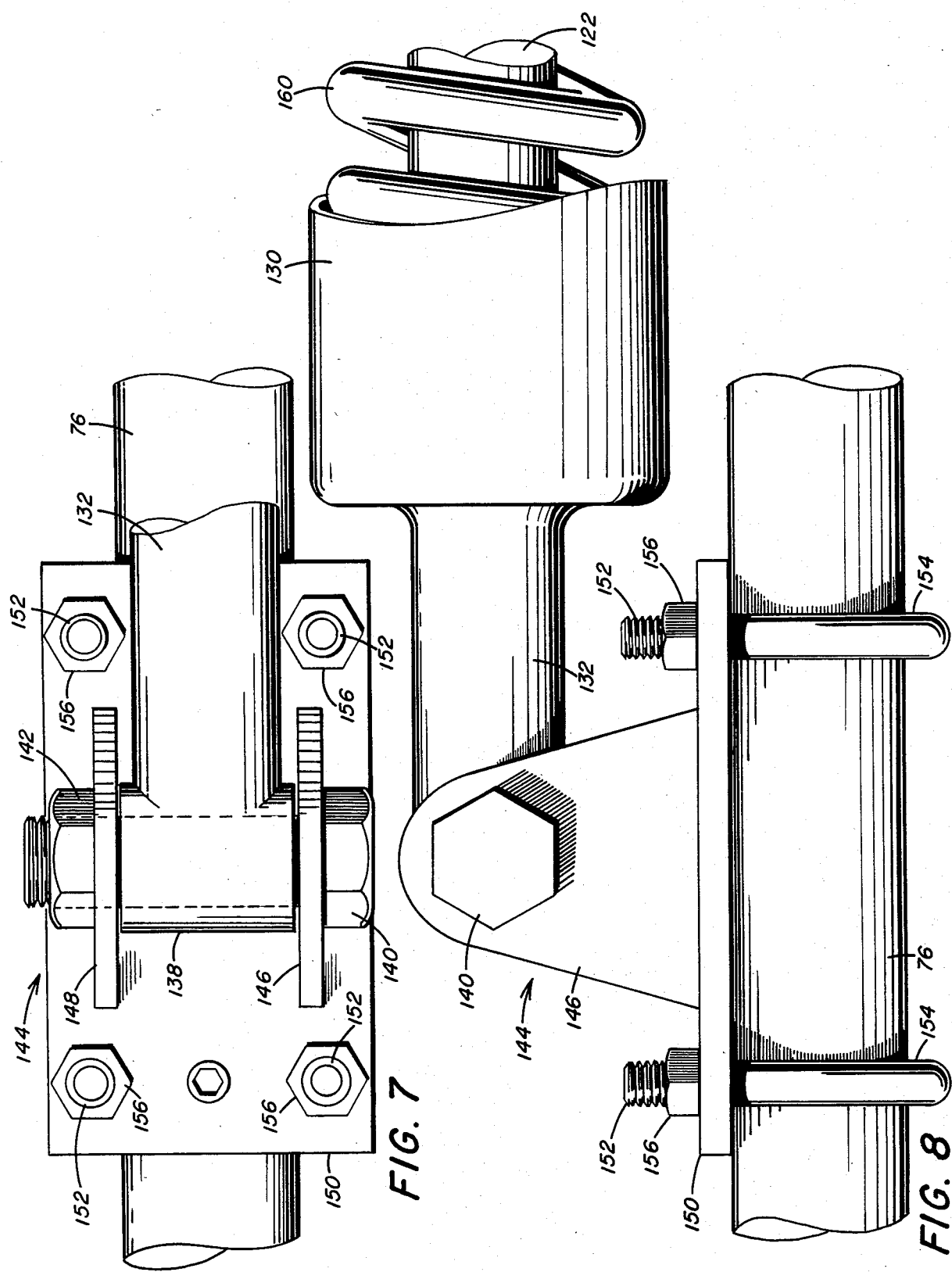

TRUCK COVER

BACKGROUND OF THE INVENTION

1. Field of the Invention

This invention relates to a truck cover and more particularly to a cover roll assembly rotatably mounted on a headboard of a truck and maintained centered over the open body of the truck as the cover is rolled and unrolled over the open body.

2. Description of the Prior Art

Roll covers for open truck bodies are well known in the art and are disclosed in U.S. Pat. Nos. 3,549,197; 3,549,199; 3,628,826 and 4,341,416. A bail assembly is pivotally mounted on the side walls of the open truck body. A cross bar of the bail is secured to the leading edge of a roll of canvas or tarpaulin and is drawn out from a take-up roll mounted on the cab or headboard of the truck by pivotal movement of the bail assembly from a forward position adjacent the cab to a rearward position adjacent the tailgate. With the bail positioned adjacent the tailgate, the open body of the truck is covered and thus the contents of the truck are covered to prevent spillage from the open body during movement of the truck.

The bail is pivotally mounted outboard of the truck side walls and a dashpot or hydraulic shock absorber exerts a force upon the bail to move the bail to a rearward position. The take-up roll is motor actuated to rotate in a first direction and unroll the cover with a force exerted upon the bail moving it rearwardly to a covered or closed position. One disadvantage with the known arrangements for controlling the movement of the bail as it swings to move the cover between the open and closed positions over the open truck is adjustments in the spring force exerted against the bail. It is important that the force exerted on the bail not be so great as to retard or prevent the cover from being rolled up on the take-up roll. Also, the spring force exerted upon the bail should be sufficient to permit controlled rearward pivotal movement of the bail. The movement of the bail should permit unrestrained unrolling of the cover from the take-up roll while pivoting in a uniform motion to assure that the cover is centered over the open truck body.

Another problem encountered with the known cover roll assemblies is maintaining the cover centered on the take-up roll as it is rolled up on the take-up roll. If the movement of the bail is not controlled during the operation of rolling the cover on the take-up roll, the cover can be displaced from a center position on the take-up roll. As a result, the cover becomes jammed at its edges with the cover housing thereby impeding the unrolling and rolling up of the cover.

Therefore, there is need for a cover roll assembly that is operable to maintain uniform movement of the bail as it is pivoted to cover and uncover the open body of a truck and maintain the cover connected to the bail in a centered position on the take-up roll.

SUMMARY OF THE INVENTION

In accordance with the present invention there is provided a cover roll assembly for a vehicle having a headboard positioned forwardly of an open body that includes a take-up roll mounted transversely on the headboard. Support means is connected to the take-up roll for rotatably supporting the takeup roll. A flexible cover is rolled up on the take-up roll and extends substantially across the width of the vehicle headboard. A bail assembly includes a pair of parallel legs spaced apart substantially the width of the open body and has end portions pivotally connected on opposite sides of the open body. A cross bar connects the pair of parallel legs and is movable between an open position closely adjacent the take-up roll at one end of the open body and a closed position displaced from the take-up roll at an opposite end of the open body. The flexible cover has one end secured to the take-up roll and an opposite end secured to the cross bar. Biasing means exerts a force upon the bail assembly to move the cross bar from the open position with the flexible cover rolled up on the take-up roll to the closed position with the flexible cover unrolled and extending over and covering the open body. Power means is drivingly connected to the take-up roll for rotating the take-up roll in a first direction to release the biasing means to exert a rearward force on the flexible cover and actuate pivotal movement of the bail assembly to move the cross bar from the open position to the closed position and unroll the flexible cover to cover the open body. The power means is operable to rotate in a second direction and actuate pivotal movement of the bail assembly and return the cross bar to the open position and roll up the flexible cover on the take-up roll. Guide means is mounted adjacent the end portions of the cross bar and are engageable with the lateral edges of the flexible cover for maintaining the flexible cover centered on the take-up roll as the flexible cover is unrolled and rolled on the take-up roll.

Preferably, the roll means includes a pair of guide rollers secured to and vertically positioned on the headboard. The guide rollers are spaced substantially the width of the cover and closely adjacent to the take-up roll. As the cover is unrolled and rolled upon pivotal movement of the bail assembly, the edges of the cover pass in contact with the guide roller. As the cover is unrolled, the guide rollers maintain the cover in a position for completely covering the open body of the truck as the bail is pivoted to the position closing the open body with the cover. During the operation of rolling up the cover on the take-up roll, the guide rollers maintain the cover centered on the roll so that the lateral edges of the cover on the roll are maintained in substantially vertical alignment to prevent jamming of the cover as it is rolled up. Thus, when the cover is completely rolled up on the take-up roll, it is centered on the roll. This assumes the correct positioning of the cover on the take-up roll when it is unrolled over the open body of the vehicle.

The biasing means includes a rod that is telescopically positioned within a sleeve. A spring is compressed between a shoulder on one end of the sleeve and a cup on one end of the telescoping rod, which is secured to the side wall of the vehicle body. The compression exerted upon the spring is adjustable by the telescoping action of the rod into and out of the sleeve. With this arrangement, movement of the bail is controlled as the cross bar is moved between the open and closed positions as the cover is unrolled over the open body.

Accordingly, the principal object of the present invention is to provide a cover roll assembly for a vehicle having an open body in which a cover is rotatably mounted on a headboard of the vehicle and is maintained in a centered position to assure that the cover, when unrolled, encloses the open body and, when rolled, is centered on the take-up roll.

Another object of the present invention is to provide, in a cover roll assembly, a bail which is spring biased to activate rearward pivotal movement of the bail when the take-up roll is rotated to unroll the cover.

A further object of the present invention is to provide a cover roll assembly that is readily mounted to a headboard positioned forwardly of an open body on a vehicle.

These and other objects of the present invention will be more completely disclosed and described in the following specification, the accompanying drawings and the appended claims.

BRIEF DESCRIPTION OF THE DRAWINGS

FIG. 3 is an enlarged, schematic view, in side elevation, of the cover roll assembly shown in FIG. 2, illustrating a pair of guide rolls for maintaining the cover centered on the take-up roll as it is unrolled and rolled on the take-up roll.

FIG. 4 is an end view of the cover roll assembly shown in FIG. 3, illustrating the motor and drive connection to the take-up roll for rotating the roll in a first direction to unroll the cover and in a second direction for rolling up the cover.

FIG. 5 is an end view of the cover roll assembly, as shown in FIG. 3, illustrating a bearing mounting of the take-up roll in a hood that is secured to the headboard of the vehicle.

FIG. 6 is an enlarged view of a spring unit for controlling the pivotal movement of the bail as the cover is rolled and unrolled.

FIG. 7 is an enlarged, fragmentary, top plan view of a bracket for connecting the spring unit shown in FIG. 6 to the bail.

FIG. 8 is an enlarged, fragmentary view, in side elevation, of the bracket shown in FIG. 7.

FIG. 9 is a fragmentary view, in side elevation, of a truck body illustrating a cover roll assembly which is mounted to the side walls of the headboard at the forward end of the truck body.

DESCRIPTION OF THE PREFERRED EMBODIMENTS

Figure 1:
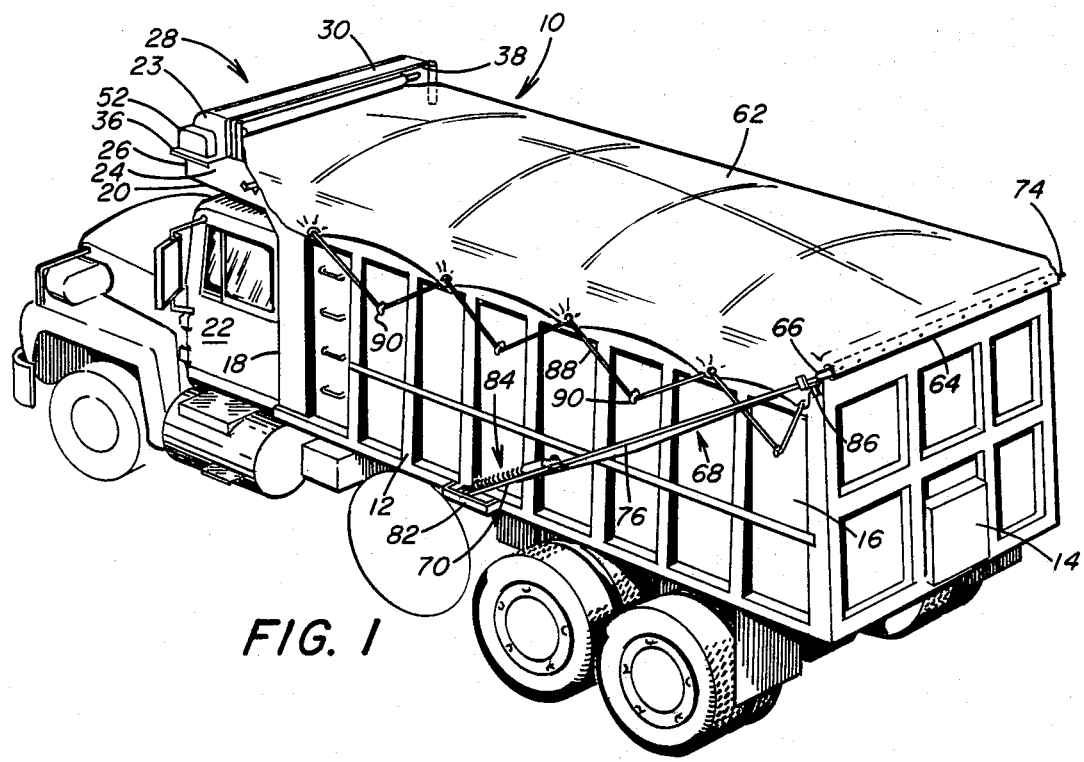
FIG. 1 is a perspective view of a truck illustrating a truck cover in accordance with the present invention covering the open bed of the truck.

Referring to the drawings, and particularly to FIGS. 1–5, there is illustrated a vehicle, such as a truck, generally designated by the numeral 10 having an open body 12 of the dump-type for hauling particulate material. The body 12 includes a rear wall or hinged gate 14 connected to a pair of side walls 16 (only one of which is shown in FIG. 1). At the opposite end of the body 12 a front wall 18 connects the side walls 16 and a headboard or cab 20 is secured to and extends forwardly from the front wall in overlying relation with a passenger compartment 22 of the truck 10. The headboard 20 is conventional in design and includes a pair of spaced apart side walls 24 connected by a front wall 26, thereby forming a recess for receiving a cover roll assembly generally designated by the numeral 28.

Figure 2:
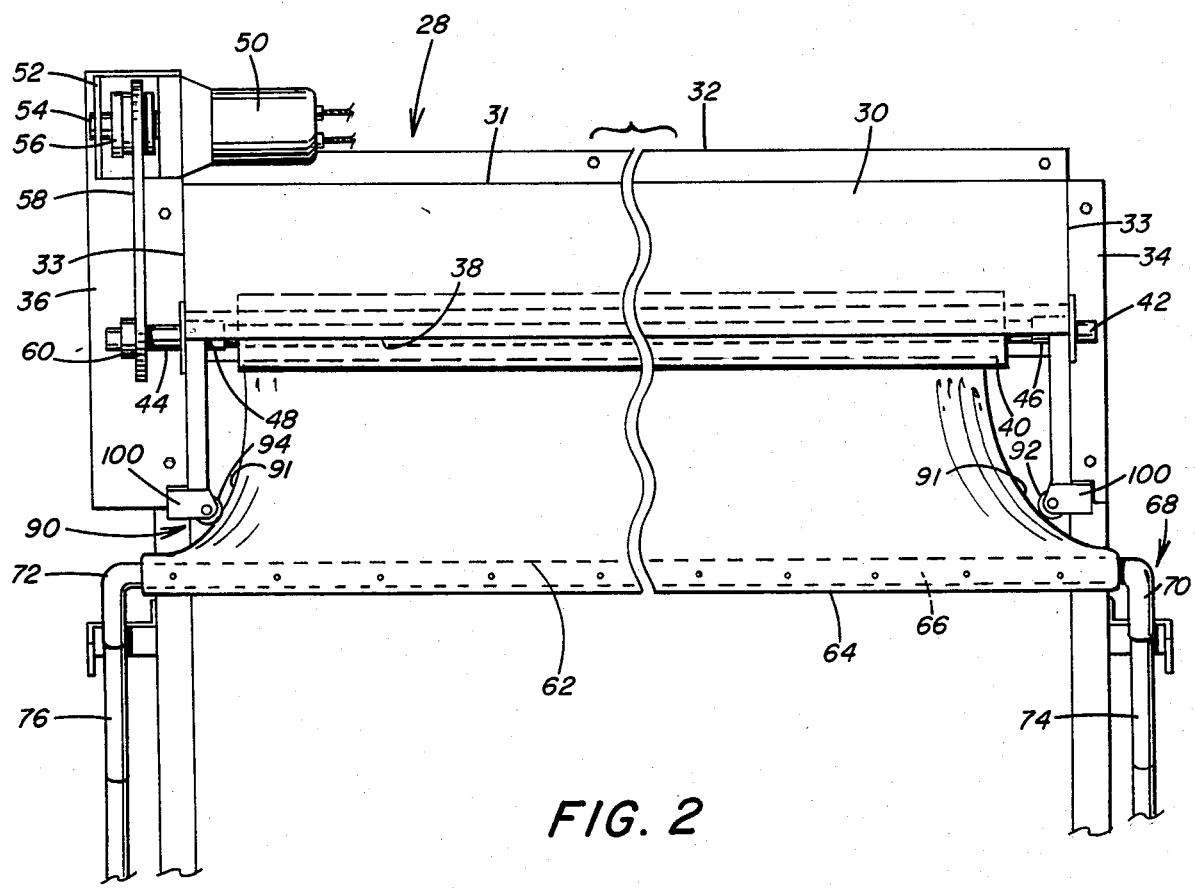
FIG. 2 is an enlarged, fragmentary, top plan view of the truck cover shown in FIG. 1, illustrating the cover rolled up on a take-up roll and a bail connected to the leading edge of the cover in a forward or open position.

The cover roll assembly 28, as illustrated in detail in FIGS. 2–5, includes an arcuately shaped hood 30 that is secured to and extends upwardly from the front wall 26 of the headboard 20. As illustrated in FIG. 2, the hood 30 includes peripheral flange portions 32, 34 and 36 that are conventionally bolted to the hood front wall 31 and side wall 33 respectively. The front end portion of the hood 30 in the direction of the movement of the truck 10 is closed and the rear end portion is open to form a cavity 38, in which is positioned a take-up roll 40. The take-up roll 40 extends the width of the truck body 12 and includes a pair of end portions 42 and 44 which are rotatably mounted by bearing assemblies 46 and 48 respectively in the hood side walls 33.

The take-up roll is reversibly rotated by a power means, such as an electric motor 50, that is mounted on a bracket 52 that extends upwardly from the flange portion 36 of the hood 30. The motor 50 includes a drive shaft 54 and a drive sprocket 56 nonrotatably connected to the shaft 54. An endless chain 58 is reeved about the drive sprocket 56 at one end and about a driven sprocket 60 at the opposite end. The driven sprocket 60 is nonrotatably connected to the take-up roll end portion 44. With this arrangement, the motor 50 is actuated to rotate the take-up roll 40 in a first direction to unroll a truck cover 62 to cover the open body 12, as illustrated in FIG. 1, and in a second direction to roll up the truck cover 62 on the take-up roll 40, as illustrated in FIG. 2.

The cover 12 is a flexible sheet material, such as a tarpaulin, fabricated of any suitable material, such as canvas, plastic, or the like. One end of the track cover 62 is secured to the take-up roll 40 and a leading edge 64 is secured to a cross bar 66 of a bail assembly generally designated by the numeral 68. The cross bar 66 includes a pair of right angle corners 70 and 72 that are suitably connected to a pair of legs 74 and 76 respectively, thereby completing the bail assembly 68. As illustrated in FIG. 1 and further in FIG. 9, each leg 74 and 76 includes an end portion 78 that is pivotally connected by a pin 80 to a bracket 82, that is bolted to the lower edge of each of the truck side walls 16. The legs 74 and 76 are positioned in parallel relation outboard of the truck side walls 16 spaced apart substantially the width of the body 12. The bail assembly 68 is pivotal on the truck body 12 to move the cross bar 66 between an open position closely adjacent the take-up roll 40 at one end of the open body 12 as illustrated in FIG. 2 and a closed position displaced from the take-up roll 40 at the opposite end of the open body 12 in which the cover 62 closes the body 12, as illustrated in FIG. 1.

The bail assembly 68 is normally maintained in the open position, as illustrated in FIG. 2, by the force exerted upon the bail assembly 68 by the cover 62 rolled up on the take-up roll 40. A biasing device 84 shown in FIGS. 6–9 is spring actuated to normally exert a rearward force upon the bail assembly 68. When the take-up roll 40 is rotated to unroll the cover 62 the biasing device 84 is actuated to pivot the bail legs 74 and 76 about the pins 80 and move the cross bar 66 to a closed position at the rear of the open body so that the cover 62 extends over the open body 12.

In operation, upon actuation of the motor 50 to unroll the cover 62 from the take-up roll 40, the biasing force of the device 84 exerts a rearward force upon the cross bar 66 to move the cross bar 66 from the headboard 20 toward the rear wall or tailgate 14 so that the legs 74 and 76 pivot rearwardly. As the bail assembly 68 pivots rearwardly, the cover 62 is unrolled over the open body 12. Once the bail 68 reaches a position beyond the vertical toward the tailgate 14, the bail assembly 68 moves under the force of gravity in a manner controlled by the unrolling of the cover 62 to the final or closed position where the bail legs 74 and 76 come to rest on a pair of brackets 86. The brackets 86 are secured to the top edge of the truck side walls 16 adjacent the tailgate 14, as illustrated in FIGS. 1 and 9. Once the cover 62 has been extended the required length to completely cover the open body 12, the cover 62 is held in place by engaging flexible cord 88 strung around the periphery of the cover 62 onto a plurality of hooks 90 secured to the side walls 16, in a manner as illustrated in FIG. 1.

To maintain the flexible cover 62 centered on the take-up roll 40, as the cover 62 is rolled up and unrolled on the take-up roll 40, a cover guide generally designated by the numeral 90 in FIGS. 2-5, engages the lateral edges 91 of the flexible cover 62 as it is rolled and unrolled, as illustrated in FIG. 2. In the embodiment illustrated in FIGS. 2-5, the cover guide 90 includes a pair of guide rollers 92 and 94 that are rotatably supported at their respective end portions 96 and 98 to a hood bracket 100 and the headboard 20. The guide rollers 92 and 94 are freely rotatable so as not to produce any resistance to the movement of the cover 62 on and off the take-up roll 40.

Preferably, the guide rollers 92 and 94 are spaced apart substantially the width of the open body 12 and somewhat inboard of the bail legs 74 and 76, as illustrated in FIG. 2. With this arrangement, the cover 62 is maintained centered over the open body 12 as it is unrolled and rolled on the take-up roll 40. The cover lateral edges 91 are maintained in alignment on the take-up roll 40, thereby assuring that the cover 62 remains centered on the take-up roll 40 and the end portions of the rolled cover 62 are equally spaced from the end portions 42 and 44 of the roll 40. This prevents jamming of the rolled cover 62 at the end portions 42 and 44 with the hood side walls and assures that the unrolling of the cover 62 is not impeded by contact of the edges 91 with the hood side walls 33.

In another embodiment of the present invention, as illustrated in FIG. 9, the take-up roll 40 is rotatably mounted by bearing assemblies that are mounted in the side walls 24 of the headboard 20 as opposed to the side walls of the hood 30, as illustrated in the embodiment shown in FIGS. 3-5. The take-up roll 40, as shown in FIG. 4, is also rotatably, reversibly driven by a drive arrangement similar to that described for the embodiment illustrated in FIGS. 2, 3 and 4. This arrangement includes a motor suitably mounted on a bracket 104 secured also to the cab side wall 24. A drive shaft 106 of the motor is nonrotatably connected to a drive sprocket 108. A driven sprocket 110 is nonrotatably connected to the end of the take-up roll 40 and an endless chain 112 transmits rotation in a first and second direction from the drive sprocket 108 to the driven sprocket 110. In this manner, the take-up roll 40 is rotated in a first direction to unroll the cover 62 and in a second direction to roll up the cover 62. Also with this arrangement the cab or headboard 20 is utilized as the means for rotatably supporting the roll 40 without the need for a separate hood.

Also associated with the embodiment illustrated in FIG. 9 is a cover guide generally designated by the numeral 114 that functions in a manner similar to the cover guide 90 described above and illustrated in FIGS. 2-5. The cover guide 114 illustrated in FIG. 9 includes a U-shaped bar 116 formed by a cross member 118 connected by a pair of upright members 120 (only one of which is illustrated in FIG. 9). The upright members 120 are suitably secured to the base of the cab 20. The upright members 120 are arranged to engage the lateral edges of the truck cover 62 as the cover is rolled up and unrolled on the take-up roll 40. In this manner, the cover 62 is maintained centered on the take-up roll 40 as above described.

Now referring to FIGS. 6-8, there is illustrated in detail the biasing device 84 that is used in both embodiments of the present invention as illustrated in FIGS. 1 and 9. The biasing device 84 includes a tubular sleeve 122 having a first end portion 124 with a boss 126 for receiving a pin 128 to rotatably connect the sleeve 120 to the bracket 82 secured to the truck side wall 16. A cup-shaped receiver 130 is welded in surrounding relation to the end of a rod 132. The rod 132 includes an opposite end portion 134 which is telescopically movable in an end 136 of the sleeve 122.

The rod 132 includes a boss 138 that is connected, as illustrated in detail in FIGS. 7 and 8, by a bolt 140 and a nut 142 to a spring tensioned bracket generally designated by the numeral 144. The spring tensioned bracket 144 includes a pair of spaced apart plates 146 and 148 for receiving the boss 138 and the nut and bolt combination 140 and 142. The bracket 144 also includes a base plate 150 to which the pair of upright plates 146 and 148 are welded. The base plate 150 includes a plurality of apertures for receiving the threaded ends 152 of U-bolts 154 that extend around each bail leg 74 and 76 respectively. The U-bolts are secured to the base plate 150 by threading nuts 156 on the bolt ends 152. In this manner, the spring tensioned bracket 150 is secured in a preselected position to the respective bail legs 74 and 76. By loosening the nuts on the threaded ends 152, the bracket 144 is movable longitudinally on the respective arms 74 and 76. This advances the rod 132 toward and away from the sleeve 122, which is fixed to the bracket 82 on the truck side wall 16.

The sleeve 122 includes an enlarged shoulder 158 as seen in FIG. 6. A bail actuating spring 160 includes an end portion 162 that abuts the shoulder 158. An opposite spring end portion 164 abuts the enclosed end of the receiver 130 on rod 132. This arrangement precompresses the spring 160 between the shoulder 158 on sleeve 122 and the receiver 130 on rod 132. Thus as the bail assembly 68 pivots to extend the cover 62 over the open body 12, the spring 160 elongates from its compressed state. This pivotal movement is initiated by rotation of the roll 40 in a direction to unroll the cover 62. The pivotal movement is restrained when the roll 40 is not rotated.

By loosening the bracket 144 on the respective bail legs 74 and 76, the sleeve 122 is movable on the rod end portion 134 to increase or decrease the distance between the closed end of the receiver 130 and the shoulder 158. Thus, the spring 160 can be compressed to a predetermined degree so as to exert a preselected biasing force on the bail assembly 68. By adjusting the position of the sleeve 122 on the rod 132, the compression of the spring 160 is adjusted which, in turn, adjusts the biasing force applied to the bail assembly 68. In this manner, the bail biasing force is easily adjusted in response to the operation of the motor 50 to roll up and unroll the cover 62 on the take-up roll 40. This assures that the spring force exerted upon the bail assembly 68 is sufficient to prevent impeding the unrolling of the cover 62 and further to assure that sufficient spring force is applied to the bail assembly 68 to prevent rapid movement of the bail assembly 68 as it is swung from the open to the closed position.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A cover roll assembly for a vehicle having a headboard positioned forwardly of an open body comprising, a take-up roll mounted transversely on the headboard, support means connected to the take-up roll for rotatably supporting the take-up roll, a flexible cover rolled up on said take-up roll and extending substantially across the width of the vehicle headboard, a bail assembly including a pair of parallel legs spaced apart substantially the width of the open body and having end portions pivotally connected on opposite sides of the open body, a cross bar connecting said pair of parallel legs movable between an open position closely adjacent said take-up roll at one end of the open body and a closed position displaced from said take-up roll at an opposite end of the open body, said flexible cover having one end secured to said take-up roll and an opposite end secured to said cross bar, biasing means for exerting a force upon the bail assembly to move said cross bar from said open position with said flexible cover rolled up on said take-up roll to said closed position with said flexible cover unrolled and extending over and covering the open body, power means drivingly connected to said take-up roll for rotating said take-up roll in a first direction to initiate unrolling of said flexible cover and operation of said biasing means to actuate pivotal movement of said bail assembly to move said cross bar from said open position to said closed position and unroll said flexible cover to cover the open body, said power means being operable to rotate in a second direction and actuate pivotal movement of said bail assembly and return said cross bar to said open position and roll up said flexible cover on said take-up roll, guide means mounted adjacent the end portions of said cross bar and engageable with said flexible cover for maintaining said flexible cover centered on said take-up roll as said flexible cover is unrolled and rolled on said take-up roll, said flexible cover including lateral edge portions, said guide means including a pair of guide rollers rotatably positioned in contact with said lateral edge portions, and said guide rollers being vertically positioned and spaced a preselected distance apart to maintain contact with said lateral edge portions so that as said cover is rolled up on said take-up roll said guide rollers guide said cover to a centered position on said take-up roll.

2. A cover roll assembly for a vehicle having a headboard positioned forwardly of an open body comprising, a take-up roll mounted transversely on the headboard, support means connected to the take-up roll for rotatably supporting the take-up roll, a flexible cover rolled up on said take-up roll and extending substantially across the width of the vehicle headboard, a bail assembly including a pair of parallel legs spaced apart substantially the width of the open body and having end portions pivotally connected on opposite sides of the open body, a cross bar connecting said pair of parallel legs movable between an open position closely adjacent said take-up roll at one end of the open body and a closed position displaced from said take-up roll at an opposite end of the open body, said flexible cover having one end secured to said take-up roll and an opposite end secured to said cross bar, biasing means for exerting a force upon the bail assembly to move said cross bar from said open position with said flexible cover rolled up on said take-up roll to said closed position with said flexible cover unrolled and extending over and covering the open body, power means drivingly connected to said take-up roll for rotating said take-up roll in a first direction to initiate unrolling of said flexible cover and operation of said biasing means to actuate pivotal movement of said bail assembly to move said cross bar from said open position to said closed position and unroll said flexible cover to cover the open body, said power means being operable to rotate in a second direction and actuate pivotal movement of said bail assembly and return said cross bar to said open position and roll up said flexible cover on said take-up roll, guide means mounted adjacent the end portions of said cross bar and engageable with said flexible cover for maintaining said flexible cover centered on said take-up roll as said flexible cover is unrolled and rolled on said take-up roll, said flexible cover including lateral edge portions, said guide means including a U-shaped bar member formed by a pair of upright members connected by a cross bar, said pair of upright members being positioned in contact with said cover lateral edge portions respectively, said cross bar positioned above said take-up roll and extending transversely relative to said cover, and said pair of upright members being maintained in contact with said cover lateral edge portions so that as said cover is rolled up on said take-up roll said upright members guide said cover to a centered position on said take-up roll.

3. A cover roll assembly as set forth in claims 1 or 2 which includes, a hood mounted on the headboard and positioned over said take-up roll, said hood having a closed end portion and an open end portion, said flexible cover being protected by said hood when rolled up on said take-up roll with said cross bar in said closed position, said flexible cover being movable through said hood open end portion as said flexible cover is rolled up and unrolled on said take-up roll, and bearing means mounted on said hood for rotatably supporting said take-up roll.

4. A cover roll assembly as set forth in claim 2 in which, said take-up roll includes a pair of end portions rotatably supported by said bearing means in said hood, p1 a bracket connected to said hood adjacent one end of said take-up roll, said power means including a motor mounted on said bracket, said motor including a reversibly rotatable drive shaft, and rotation transmission means for transmitting rotation from said drive shaft to said take-up roll end portion to rotate said take-up roll in both a first direction to unroll said flexible cover and in a second direction to roll up said flexible cover.

5. A cover roll assembly as set forth in claims 1 or 2 in which, said take-up roll includes opposite end portions, means for rotatably supporting said opposite end portions on the headboard, said power means including a motor supported on the headboard, said motor including a reversibly rotatable drive shaft, and rotation transmission means for transmitting rotation from said drive shaft to said take-up roll end portion to rotate said take-up roll in both a first direction to unroll said flexible cover and in a second direction to roll up said flexible cover.

6. A cover roll assembly as set forth in claims 1 or 2 in which, said biasing means includes a first end portion stationaryily positioned relative to said bail assembly and a second end portion movably secured to said bail assembly, a resilient device compressed between said first and second end portions for exerting a force upon said bail assembly tending to pivot said bail assembly away from said take-up roll, and said second end portion being adjustable in position relative to said bail assembly to control the compression on said resilient device and control the pivotal movement of said bail assembly as said cover is unrolled from said take-up roll.

7. A cover roll assembly as set forth in claims 1 or 2 in which, said biasing means includes a tubular sleeve fixed for pivotal movement at one end portion relative to said bail assembly, a rod telescopically positioned at one end portion relative to said sleeve and having a second end portion adjustably positioned relative to said bail assembly, a resilient device positioned on said sleeve and said rod, said resilient device being compressible and having opposite end portions, means positioned on said sleeve and said rod for abutting said resilient device opposite end portions, said sleeve being longitudinally movable relative to said rod to compress said resilient device to a predetermined compression for exerting a force upon said bail assembly tending to pivot said bail assembly away from said take-up roll, and adjustment means for selectively positioning said sleeve relative to said bail assembly to control the compression on said resilient device and control the pivotal movement of said bail assembly as said cover is unrolled from said take-up roll.

8. A cover roll assembly as set forth in claim 7 in which, said adjustment means includes a bracket, means for securing said bracket to said bail assembly to permit longitudinal movement of said bracket to a preselected position on said bail assembly, and said sleeve including a second end portion secured to said bracket such that said sleeve is movable with said bracket on said bail assembly to control the degree of compression of said resilient means for controlling the pivotal movement of said bail assembly.

9. A bail assembly for a truck cover for mounting on a truck body comprising, a pair of parallel legs spaced apart substantially the width of the truck body and having first and second end portions, said legs first end portions being pivotally mounted on the truck body, a cross bar connecting said legs second end portions, said cross bar and said pair of legs being movable as a unit on the truck body between an open position at one end of the truck body and a closed position at an opposite end of the truck body, biasing means for normally applying a force upon the bail assembly to move said cross bar from said open position to said closed position, said biasing means including a tubular member having a first end portion fixed for pivotal movement on the truck adjacent said second end portion of each of said legs, said tubular member having an open end portion opposite said first end portion and a shoulder spaced from said open end portion, a rod having a first end portion movably positioned within said tubular member and a second end portion extending outwardly from said tubular member open end portion, an abutment device secured in surrounding relation to said rod second end portion, said rod abutment device being movable toward and away from said tubular member shoulder as said rod first end portion moves within said tubular member, a compressible device positioned on said tubular member and said rod, said compressible device having a first end portion abutting said tubular member shoulder and a second end portion abutting said rod abutment device, said rod being longitudinally movable within said tubular member to vary the distance between said tubular member shoulder and said rod abutment device to increase and decrease the degree of compression of said compressible device, and means for securing said rod second end portion to said respective leg to permit telescopic movement of said rod relative to said tubular member on said leg to control the degree of compression of said compressible device to permit adjustments in the force applied by said biasing means upon the bail assembly.

10. A cover roll assembly as set forth in claims 1 or 2 in which, said power means normally acts to restrain the force exerted by said biasing means upon said bail assembly to maintain said flexible cover rolled up on said take-up roll so that upon actuation of said power means said take-up roll is rotated to release the restraining force on said baising means to actuate pivotal movement of said bail assembly.

* * * * *